US008103659B1

(12) United States Patent
Spiegel

(10) Patent No.: US 8,103,659 B1
(45) Date of Patent: Jan. 24, 2012

(54) PERSPECTIVE-BASED ITEM NAVIGATION

(75) Inventor: Joel R. Spiegel, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 239 days.

(21) Appl. No.: 11/448,377

(22) Filed: Jun. 6, 2006

Related U.S. Application Data

(60) Provisional application No. 60/687,935, filed on Jun. 6, 2005.

(51) Int. Cl.
*G06F 7/00* (2006.01)
*G06F 17/30* (2006.01)
*G06F 12/00* (2006.01)
*G06F 15/16* (2006.01)

(52) U.S. Cl. ......... 707/722; 707/737; 707/758; 707/899

(58) Field of Classification Search ............ 707/3, 722, 707/734, 737, 758, 899
See application file for complete search history.

(56) References Cited

U.S. PATENT DOCUMENTS

| 5,754,938 | A | * | 5/1998 | Herz et al. ............ 725/116 |
| 5,754,939 | A | * | 5/1998 | Herz et al. ............ 455/3.04 |
| 5,890,149 | A | * | 3/1999 | Schmonsees ............ 707/3 |
| 6,029,195 | A | * | 2/2000 | Herz ............ 725/116 |
| 6,041,311 | A | * | 3/2000 | Chislenko et al. ........ 705/27 |
| 6,047,327 | A | * | 4/2000 | Tso et al. ............ 709/232 |
| 6,092,049 | A | * | 7/2000 | Chislenko et al. ........ 705/7.29 |
| 6,185,558 | B1 | | 2/2001 | Bowman et al. |
| 6,236,985 | B1 | * | 5/2001 | Aggarwal et al. ............ 707/2 |
| 6,349,309 | B1 | * | 2/2002 | Aggarwal et al. ............ 707/200 |
| 6,356,879 | B2 | * | 3/2002 | Aggarwal et al. ............ 705/26 |
| 6,460,036 | B1 | * | 10/2002 | Herz ............ 707/10 |
| 6,493,702 | B1 | * | 12/2002 | Adar et al. ............ 707/706 |
| 6,925,460 | B2 | * | 8/2005 | Kummamuru et al. ........ 707/3 |
| 6,981,040 | B1 | * | 12/2005 | Konig et al. ............ 709/224 |
| 7,028,024 | B1 | * | 4/2006 | Kommers et al. ............ 707/3 |
| 7,031,961 | B2 | * | 4/2006 | Pitkow et al. ............ 707/4 |
| 7,035,653 | B2 | * | 4/2006 | Simon et al. ............ 455/466 |
| 7,124,129 | B2 | | 10/2006 | Bowman et al. |
| 7,158,986 | B1 | * | 1/2007 | Oliver et al. ............ 707/102 |
| 7,181,438 | B1 | * | 2/2007 | Szabo ............ 707/2 |
| 7,305,390 | B2 | | 12/2007 | Bowman et al. |
| 7,320,031 | B2 | * | 1/2008 | Konig et al. ............ 709/224 |
| 7,630,986 | B1 | * | 12/2009 | Herz et al. ............ 1/1 |
| 2002/0038281 | A1 | * | 3/2002 | Lohmann et al. ............ 705/37 |
| 2002/0152200 | A1 | * | 10/2002 | Krichilsky et al. ............ 707/3 |
| 2002/0152201 | A1 | * | 10/2002 | Nanavati et al. ............ 707/3 |
| 2002/0156770 | A1 | * | 10/2002 | Krichilsky et al. ............ 707/3 |

(Continued)

OTHER PUBLICATIONS

Brown, P.J. et al., "Context-aware Retrieval: Exploring a New Environment for Information Retrieval and Information Filtering," *Personal and Ubiquitous Computing*, 2001, vol. 5, pp. 253-263.

(Continued)

*Primary Examiner* — Mohammad Ali
*Assistant Examiner* — Griselle Corbo
(74) *Attorney, Agent, or Firm* — Novak Druce + Quigg LLP

(57) ABSTRACT

A facility for tailoring navigation results is described. The facility receives a navigation request from a distinguished user. In response, the facility identifies a user group to which the distinguished user belongs and presents to the distinguished user a navigation result responsive to the navigation request that is adapted for members of the identified user group.

40 Claims, 6 Drawing Sheets

U.S. PATENT DOCUMENTS

| | | | |
|---|---|---|---|
| 2003/0014399 A1* | 1/2003 | Hansen et al. | 707/3 |
| 2003/0037041 A1* | 2/2003 | Hertz | 707/1 |
| 2003/0087652 A1* | 5/2003 | Simon et al. | 455/466 |
| 2003/0088463 A1* | 5/2003 | Kanevsky et al. | 705/14 |
| 2003/0131000 A1* | 7/2003 | Bates et al. | 707/7 |
| 2004/0128282 A1* | 7/2004 | Kleinberger et al. | 707/3 |
| 2004/0172267 A1* | 9/2004 | Patel et al. | 705/1 |
| 2004/0186722 A1* | 9/2004 | Garber et al. | 704/270.1 |
| 2005/0071328 A1* | 3/2005 | Lawrence | 707/3 |
| 2005/0165766 A1* | 7/2005 | Szabo | 707/3 |
| 2005/0222989 A1* | 10/2005 | Haveliwala et al. | 707/3 |
| 2005/0240580 A1* | 10/2005 | Zamir et al. | 707/4 |
| 2006/0111959 A1* | 5/2006 | Tarr et al. | 705/10 |
| 2006/0143075 A1* | 6/2006 | Carr et al. | 705/14 |
| 2006/0229896 A1* | 10/2006 | Rosen et al. | 705/1 |
| 2007/0067297 A1* | 3/2007 | Kublickis | 707/9 |
| 2007/0094258 A1* | 4/2007 | Okuzawa | 707/8 |
| 2007/0226198 A1* | 9/2007 | Kapur | 707/3 |
| 2008/0114756 A1* | 5/2008 | Konig et al. | 707/5 |
| 2008/0177728 A1* | 7/2008 | Bowman et al. | 707/5 |
| 2008/0256069 A1* | 10/2008 | Eder | 707/5 |
| 2008/0319971 A1* | 12/2008 | Patterson | 707/5 |

OTHER PUBLICATIONS

Factiva, "Factiva Modules, Extend the power of your intranet or portal," located at <http://www.factiva.com/integration/factivamodules/search.asp?>, 2001, 3 pages.

IBM Research, "IBM Almaden Research Center, Web Foundation," located at <http://www.almaden.ibm.com/webfoundation/>, last accessed on Jul. 27, 2004, 2 pages.

* cited by examiner

PERSPECTIVE-BASED ITEM NAVIGATION

CROSS-REFERENCE TO RELATED APPLICATION

This application claims the benefit of U.S. Provisional Patent Application No. 60/687,935, which is hereby incorporated by reference in its entirety.

TECHNICAL FIELD

The present invention is directed to the field of item navigation optimization techniques.

BACKGROUND

Searching refers to a process in which a user submits a query, such as a list of keywords, and receives in return a search result. The search result is a set of one or more items in a search domain matching the query. For example, a query may be applied against a search domain of documents, such as web pages or other documents containing text or having text associated with them. A query may similarly be applied against a search domain corresponding to the catalog of products or services available for purchase from an online merchant.

For expansive search domains, it is common for a query result presented to a user to contain a significant number of items that would be considered by the user to be irrelevant to his or her query. For example, a query result for the query "jaguar" may include items relating to jaguar animals, Jaguar automobiles, the Jaguar operating system, or the Jacksonville Jaguars football team. A user submitting the query who is interested in jaguar animals would consider items relating to the automobiles, operating system, and football team to be irrelevant, and the presence of these additional items in the query result would make the query result less useful to this user.

The results provided by additional kinds of item navigation techniques, such as item browsing, often suffer from similar relevancy deficiencies.

Accordingly, an approach to performing navigation requests and/or presenting their results that reduced the number of items presented to users that would be considered irrelevant by the users to their queries would have significant utility.

DETAILED DESCRIPTION

Figure 1:
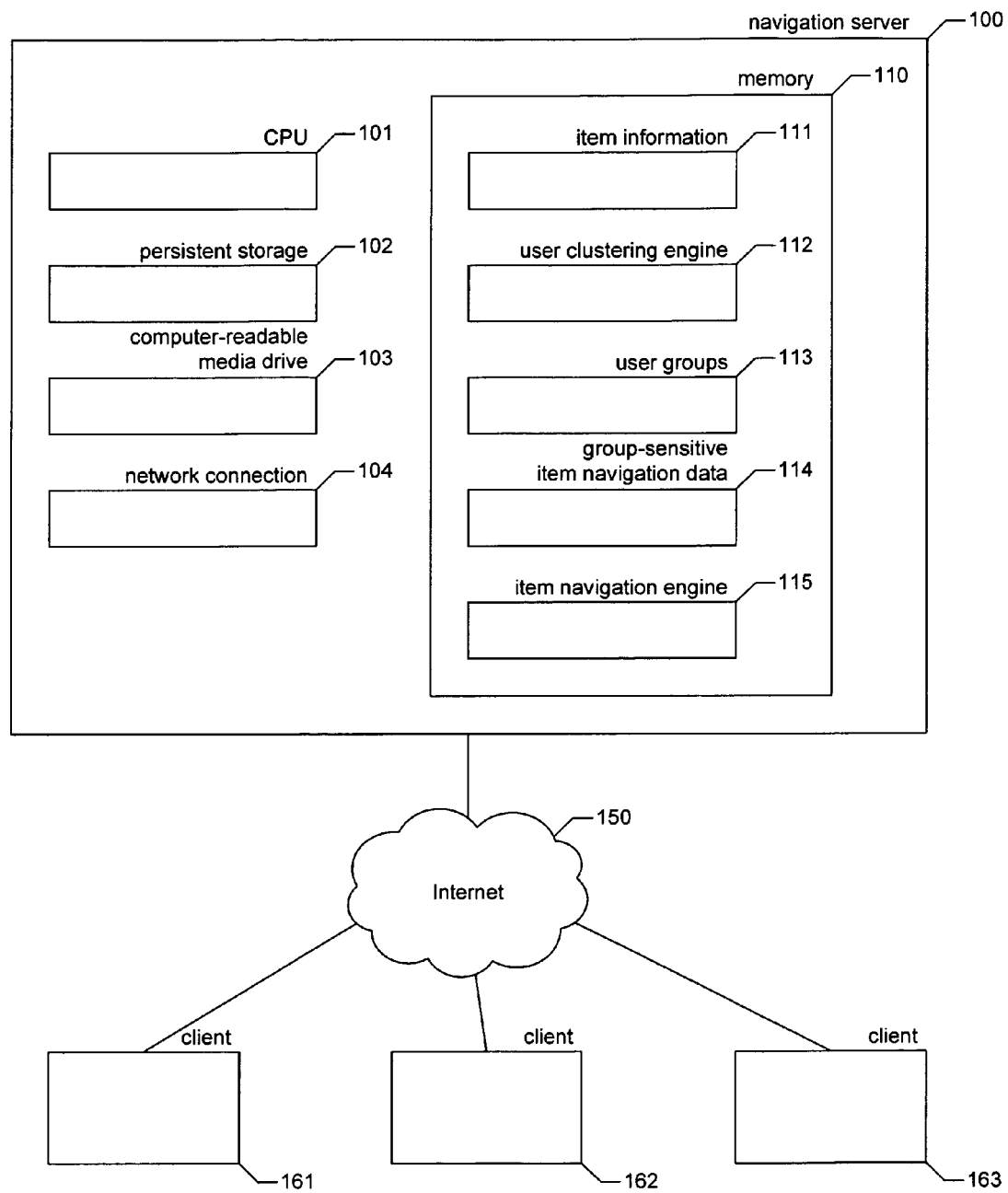
FIG. 1 is a block diagram showing some of the components typically incorporated in at least some of the computer systems and other devices on which the facility executes.

A software and/or hardware facility for providing perspective-based item navigation ("the facility") is described. The facility (1) segments a number of users each into one or more user groups based upon user behavior likely to reflect each user's interests and/or perspectives—each such group is said to correspond to a different perspective; and (2) displays item navigation results to each user, such as item search results or item browsing results, in a manner that reflects a group of which the user is or is likely to be a member. By displaying item navigation results in this way, embodiments of the facility increases the likelihood that each user will consider his or her browsing results to be relevant to his or her interests or perspectives.

Some embodiments of the facility further permit a user to display different views of the same navigation results, each corresponding to a different group and therefore a different perspective. For example, for a particular navigation result, embodiments of the facility may permit the user to switch between different views of the navigation result by switching between different groups of which the user is a member. By doing so, the facility allows a user to uncover relevant browsing results when irrelevant browsing results are initially displayed.

In order to perform segmentation, for each user, the facility identifies one or more groups of users in which the user belongs. In some embodiments, the facility can identify multiple groups for a single user. In many cases, these groups correspond to user interests in particular subjects. The facility performs such identification using information about each user, such as: the user's navigation history, including a user's browse history (e.g., history of resources visited, time spent on each resource, etc.) or search history (e.g., history of search queries, history of selecting items from resulting query results, etc.); the user's purchase history, including addition of items to a shopping cart and/or purchasing items; a user's history of submitting item reviews; and user session information, such as source IP address, time of day, and referrer domain. In some embodiments, segmentation further involves computing segmentation weights, such as (1) weights indicating the level affinity each user has to each group of which they are determined to be a member, or (2) a weight for each group indicating a level of confidence that the members of the segment are properly grouped together.

In order to support multiple views of navigation, the facility compiles information about the level of interest in particular items by users on a per-group basis. For example, where the facility is used in connection with a user behavior-based search result sorting/subsetting technique that maintains statistics on the rate with which users select particular items from search results generated for queries having particular statistics, the facility causes these statistics to be compiled separately for each group of users.

When a user submits a navigation request, the facility (1) generates a navigation result that is responsive to the request, and (2) displays a view of the navigation result corresponding to one of the groups of which the user is a member. In some cases, the facility automatically selects this initial group from all of the groups of which the user is a member based upon session or history information for the present session. For example, where the navigation request is a search request, the facility may generate the view of the navigation result for the initial group by applying the statistics compiled for the initial group in order to sort the items in the search result by their level of relevance to members of the group, and/or subset the search result to exclude items not of at least a minimum level of relevance to members of the group.

In some embodiments, the facility supports attributing mnemonic names to groups. Such names may, for example, be attributed by editorial fiat, or based upon user suggestions.

In some embodiments, where the initial group is not named, the facility prompts the user to suggest a name for the initial group based upon the displayed navigation result for the initial group. If the same name is recurringly submitted for a group, the facility attributes that name to the group.

FIG. 1 is a block diagram showing some of the components typically incorporated in at least some of the computer systems and other devices on which the facility executes. A navigation server computer system 100 may include one or more central processing units ("CPUs") 101 for executing computer programs; a persistent storage device 102, such as a hard drive, for persistently storing programs and data; a computer-readable media drive 103, such as a CD-ROM drive, for reading programs and data stored on a computer-readable medium; and a network connection 104 for connecting the computer system to other computer systems, such as via the Internet, to exchange programs and/or data-including data structures. The navigation server computer system further includes a memory 110, containing: item information 111 that may be displayed for items included in a navigation result; a user clustering engine 112; user groups 113 created by the user clustering engine; group-sensitive item navigation data 114; and an item navigation engine 115 that uses the group-sensitive item navigation data to generate navigation results for particular groups. The navigation server computer system is connected to a number of client computer systems, such as client computer systems 161-163, via a network such as the Internet 150. The navigation server receives navigation requests from the clients, such as search requests and/or browse requests, and returns navigation results tailored based upon one or more groups to which the user of the client belongs.

While computer systems configured as described above are typically used to support the operation of the facility, one of ordinary skill in the art will appreciate that the facility may be implemented using devices of various types and configurations, and having various components. While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
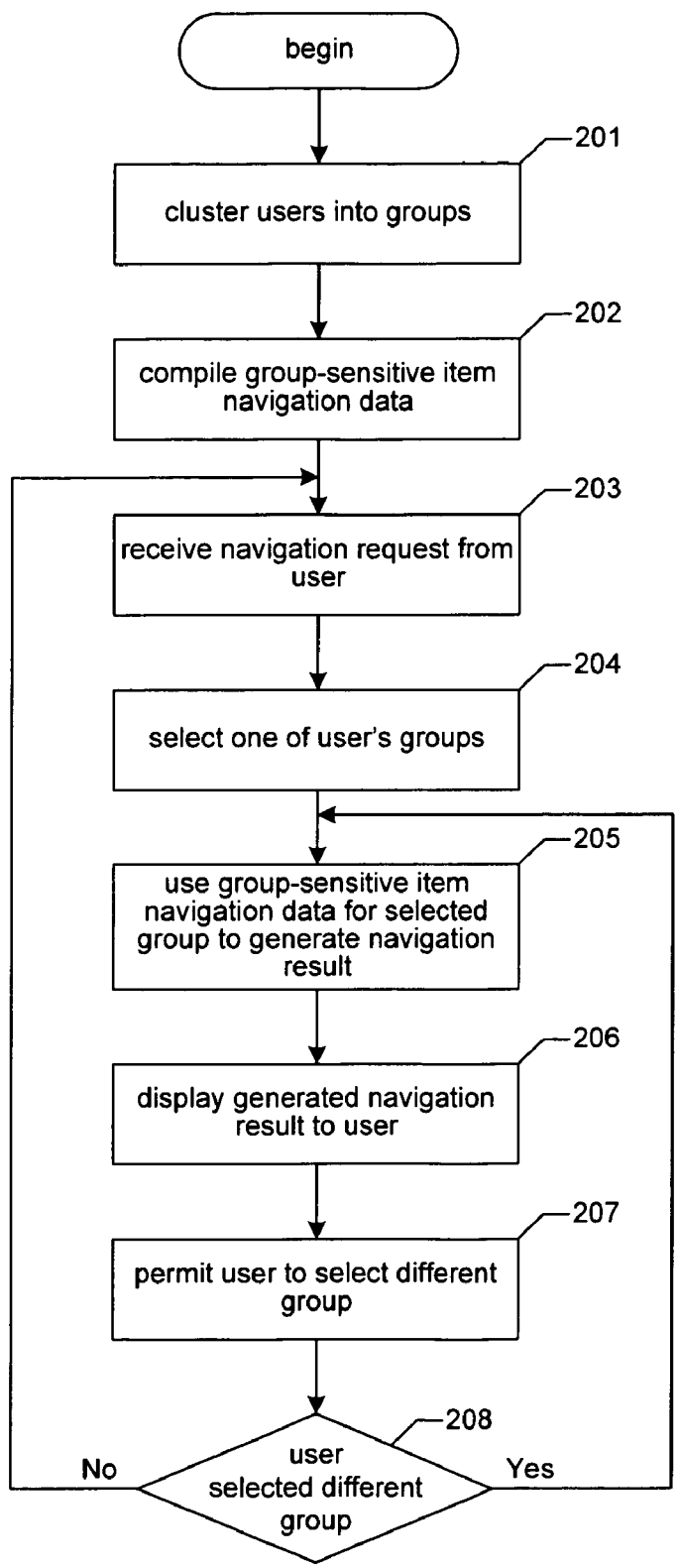
FIG. 2 is a flow diagram showing steps performed by the facility.

FIG. 2 is a flow diagram showing steps performed by the facility. For purposes of the present discussion, it is expected that users are likely to have an affinity for the same items selected by similar users. Accordingly, in step 201, the facility segments users into groups based upon various information associated with each user. In one embodiment, the facility segments users into groups based on explicit statements of affinity submitted by each user. In another embodiment, the facility segments users into groups implicitly based on similar user attributes which can be maintained in a user profile or obtained from session information such as referrer domain, zip code, IP address, time of day, shipping address, etc. Both such techniques are described in U.S. Pat. No. 6,963,850, which is hereby incorporated by reference in its entirety. In yet other embodiments, the facility segments users into groups based on previous or concurrent user behavior, e.g., purchase history; navigation history, including browse history and search history; session history; review history; etc. Data segmenting techniques for grouping users based on such information can include hierarchical (divisive or agglomerative) and/or partitional clustering techniques. One skilled in the art will recognize that any suitable segmenting technique, whether or not a hierarchical or partitional clustering technique, may be used to segment users into groups without departing from the spirit and scope of this disclosure.

In yet another embodiment, prior to performing segmenting techniques to segment users into groups, a pre-processing step is performed to identify an initial population of users most likely to share a perspective(s) with the current user. By identifying such an initial population of users, those users least likely to have an affinity for the same items or subjects as the current user are removed from further consideration. Segmenting techniques can then be applied to the initial population of users to segment the users of that population into one or more groups, each group corresponding to a different perspective that is more likely to be shared by the current user.

For example, where the navigation request is a search request, it is expected that if users in the initial population (or subsets thereof) submitted search queries similar to that submitted by the current user, the behavior of the initial population (or subsets thereof) with respect to the search results obtained is more likely to indicate which search results will be most relevant to those of the current user. Accordingly, in one embodiment, the initial population of users is identified based on prior search request information. Such search request information may include specific search query terms, search query phrases or the search request, i.e., query, itself. Accordingly, a user may be included in the initial population if: (1) the user has submitted a search request that is itself substantially similar (either semantically or due to substantially overlapping query terms) to the search request submitted by the current user; (2) the user has submitted a search request with at least one substantive query term in common with the search request submitted by the current user; or (3) the user has submitted a search request with at least one substantive query phrase in common with the search request submitted by the current user. In one embodiment, the facility loops through each query term included in a submitted search request by at least a minimum number of users in a foregoing period of time, and, for each such query term, identifies the users who submitted a search request including the query term during the period. In another embodiment, the facility identifies all users who have submitted the same search request during a particular time interval. In either embodiment, the identified users are considered the initial population and thus, are subjected to further segmentation as described above.

In some embodiments, in step 201, the facility further computes segmentation weights such as (1) weights indicating the level of affinity that each user has to each group of which they are determined to be a member, and/or (2) a weight for each group indicating a level of confidence that the members of the segment are properly grouped together.

In step 202, the facility compiles group-sensitive item navigation data. In general, step 202 involves analyzing information about the behavior of the users in each group with respect to each item. In some embodiments, the facility limits the group-sensitive item navigation data compiled in step 202 to item navigation data reflecting item navigation behavior during a particular period of time, such as the last seven days, and/or weights the compiled group-sensitive item navigation data in such as way as to give more weight to item navigation data reflecting more recent item navigation behavior. In some embodiments, step 202 involves creating item navigation resources—such as search indices and/or browse graphs— that directly incorporate information about which items are most relevant to which groups under which conditions. In other embodiments, in step 202 the facility augments item information to indicate which items are the most relevant to which groups under which conditions. In further embodiments, the facility creates an additional resource that is part of neither the item navigation resources nor the item information that indicates which items are most relevant to which groups under which conditions.

In some embodiments, step 202 involves creating an item-group rating table that rates the relevance of each item to members of each group for use in adapting browse results and/or search results. In some embodiments, step 202 involves creating a separate set of item-term rating tables for each group for use in adapting such results, as is described in one or more of the following, each of which is hereby incorporated by reference in its entirety: U.S. patent application Ser. No. 09/033,824, filed Mar. 3, 1998; U.S. patent application Ser. No. 09/041,081, filed Mar. 10, 1998, issued as U.S. Pat. No. 6,185,558 on Feb. 6, 2001; U.S. patent application Ser. No. 09/665,822, filed Sep. 20, 2000; U.S. patent application Ser. No. 09/847,954, filed May 2, 2001; and U.S. patent application Ser. No. 10/966,827, filed Oct. 15, 2004. In particular, in some embodiments, for each group, the facility creates a table indicating, for each of a number of combinations of an item with a query term, a measure of the relevance of that query term to that item in the eyes of members of the group. Specifically, each of these measures reflects the extent to which members of the group have selected the item when it appeared in a query result generated for a query containing the term.

In some embodiments, the facility periodically updates the results of steps 201 and/or 202 (not shown).

In step 203, the facility receives a navigation request from a user, such as a search request or a browse request. In step 204, the facility selects one of the requesting user's groups. In some embodiments, step 204 involves selecting the group for which the user has the highest affinity strength. In some embodiments, step 204 involves selecting one of the groups to which the user belongs based upon recent activity by the user, such as earlier activity during the present session. In some embodiments, step 204 involves selecting a group most recently explicitly selected by the user. In some embodiments, step 204 involves selecting a group from the groups listed for any terms involved in the navigation request, such as any terms included in a search query.

In step 205, the facility uses the group-sensitive item navigation data compiled in step 202 for the selected group to generate a navigation result that is responsive to the navigation request received in step 203. As noted above in connection with step 202, in some embodiments, this involves using a particular item-term rating table created for the selected group. In some embodiments, in addition to or instead of using group-sensitive item navigation data earlier compiled in step 202, the facility uses group-sensitive item navigation data compiled on-the-fly as part of step 205. In some embodiments, step 205 involves a single phase in which the facility generates a navigation result that is both responsive to the received navigation request and tailored to the selected group. In other embodiments, step 205 involves a two-phase process, in which the facility first generates a group-agnostic navigation result, then adapts the group-agnostic navigation result to make it group-sensitive. Some ways that embodiments of the facility make a navigation result group-sensitive are to exclude items that would otherwise be included in the navigation result that are indicated to be of little relevance to users in the selected group, and/or sort the items in the navigation result in decreasing order of their indicated relevance to the selected group.

In step 206, the facility displays the navigation result generated in step 205 to the user. In step 207, if the user is dissatisfied with the navigation result displayed in step 206, the facility permits the user to select a different group for which to view the navigation result. In some embodiments, step 207 involves permitting the user to select a different group from among the groups listed for any term associated with the navigation request. In step 208, if the user selects a different group, then the facility continues in step 205 to generate and display a navigation result for the group selected in step 207, else the facility continues in step 203 to receive the next navigation request.

Figure 3:
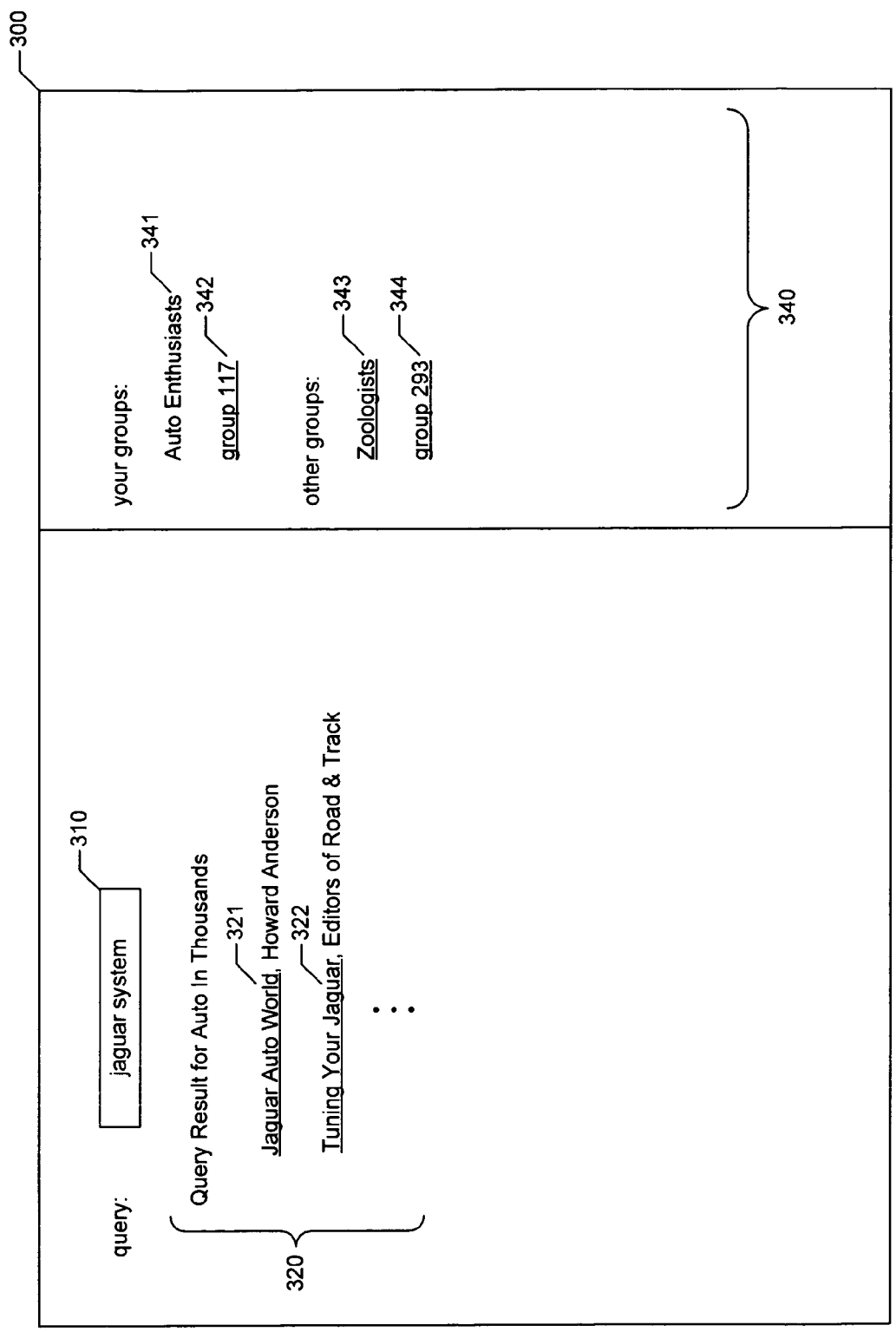
FIG. 3 is a display diagram showing a first version of a search result.

FIGS. 3-6 are display diagrams showing sample displays typical of those presented by the facility. FIG. 3 is a display diagram showing a first version of a search result. In the display 300, the user has entered the query "jaguar system" in a query field 310. As a result, the facility has displayed search result 320 for a group named "Auto Enthusiasts", of which the user is a member. In some embodiments, the facility selects the "Auto Enthusiast" group based upon session or history information for the present session. In some embodiments, the facility selects the "Auto Enthusiast" group as either: (1) the group to which the user has the highest level of affinity; (2) among the groups of which the user is a member, the group having the highest membership confidence level; or (3) the group whose search results contains the highest-confidence item, or otherwise is attributed the highest collective confidence value. Search result 320 includes items 321 and 322, each located in the index using the submitted query, and each relating to automobiles. The display 300 further includes indications 340 of groups other than the "Auto Enthusiast" group. Section 340 includes groups of which this user is a member, such as the "Auto Enthusiast" group 341 and a "group 117" group 342. Section 340 further includes groups of which this user is not a member, such as a "Zoologists" group 343 and a "group 293" group 344. In some embodiments, the facility orders groups 341-342 and/or groups 343-344 based upon one or more of the following: (1) the user's level of affinity to each group; (2) the membership confidence level of each group; and (3) the confidence level of the navigation result produced for each group. The user may preferably click on or otherwise select one of these groups to display the same search results from the perspective of the selected group.

Figure 4:
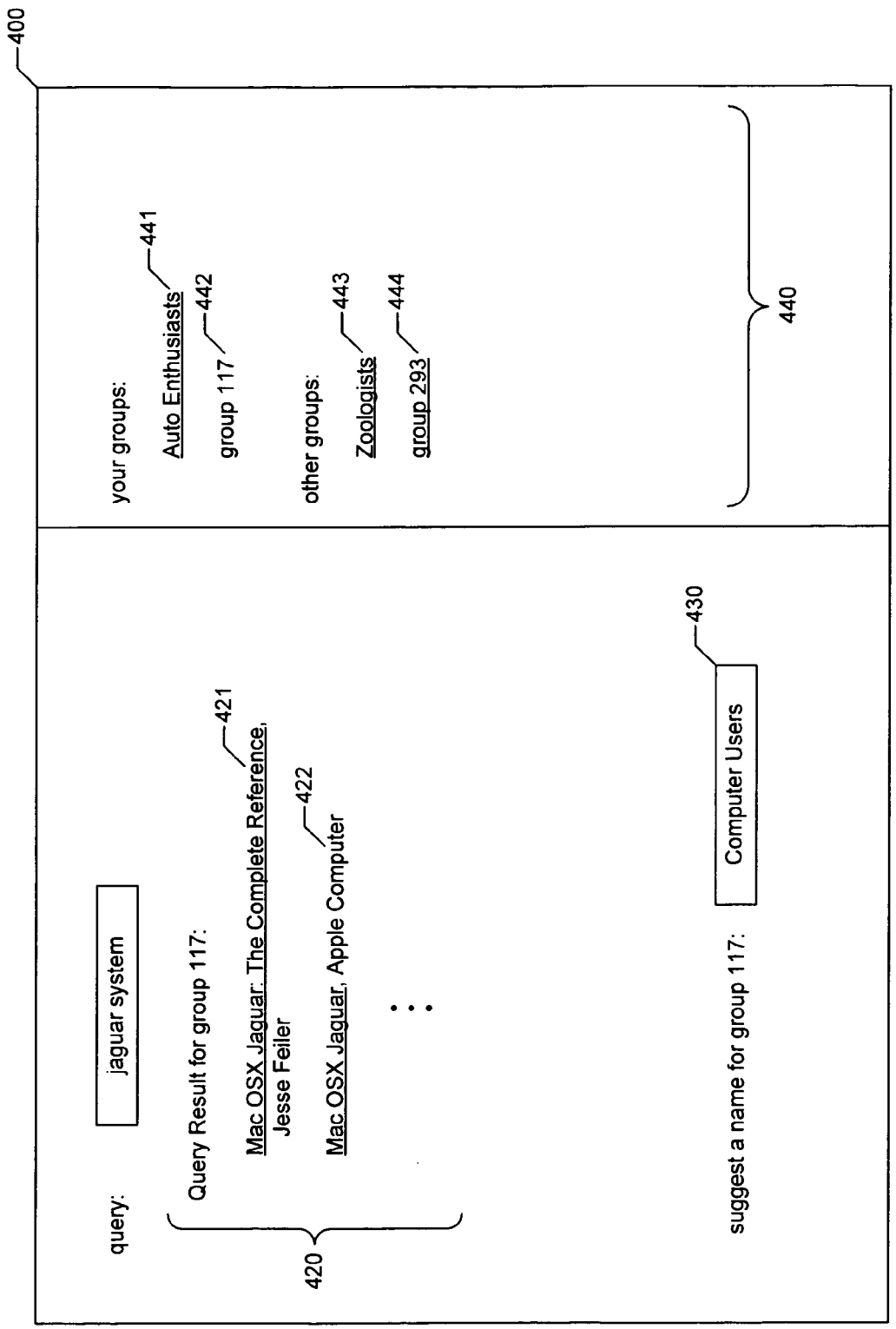
FIG. 4 is a display diagram showing a second version of the search results shown in FIG. 3.

FIG. 4 is a display diagram showing a second version of the search results shown in FIG. 3, resulting from the user selecting indication 342 for the "group 117" group in FIG. 3. It can be seen that display 400 contains a different search result 420 for the "group 117" group, including items 421 and 422. These items are also returned by the query engine for the query "jaguar system" and are determined by the facility to be relevant to the members of group 117. In this case, because the "group 117" group has not yet been assigned a mnemonic name, the facility includes in display 400 a field 430 into which the user may enter a suggested name for this group. Because the items of search result 420 each relate to a computer operating system, the user enters the suggested name "Computer Users" in field 430.

Figure 5:
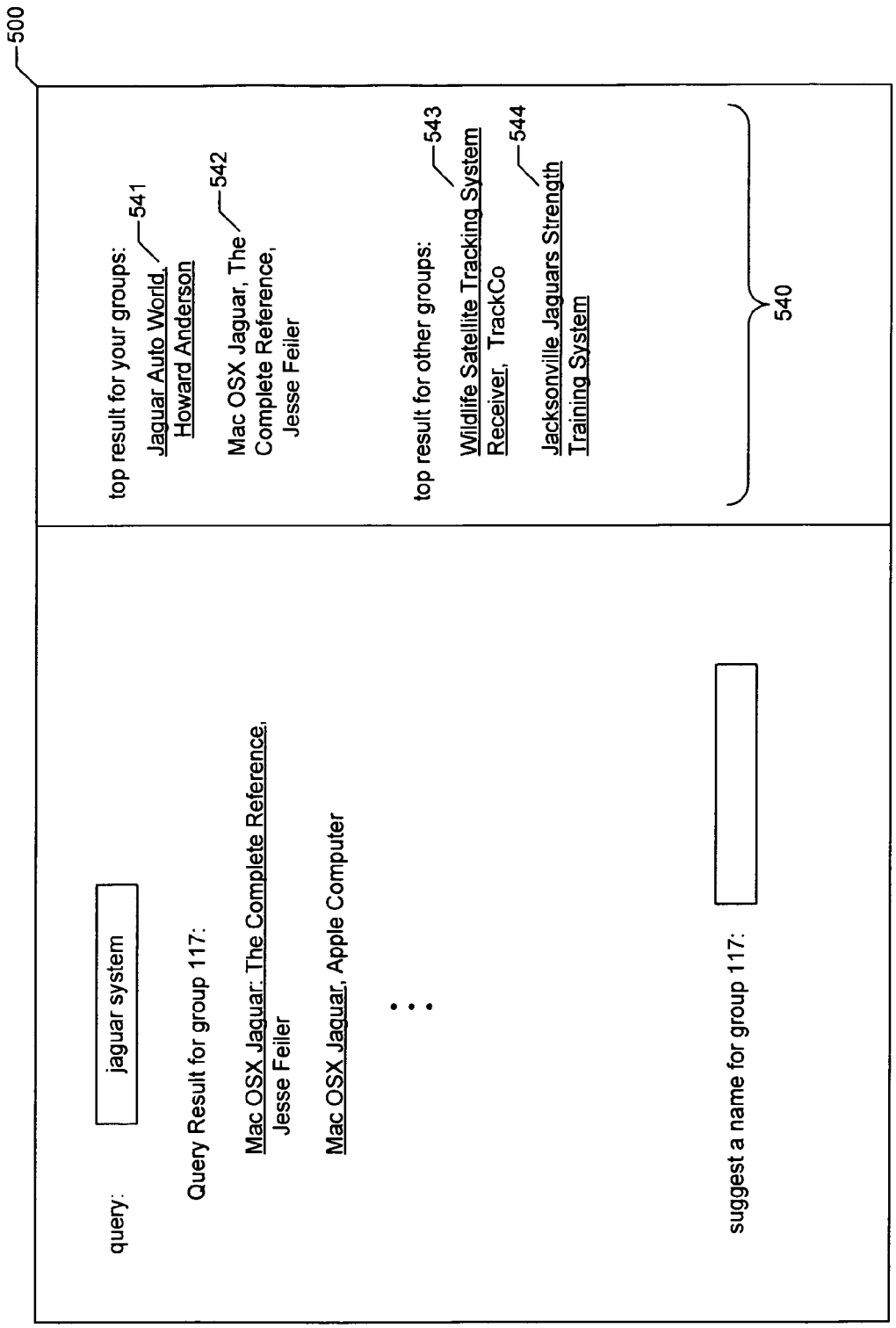
FIG. 5 is a display diagram showing an alternative approach to displaying the display shown in FIG. 4 employed by some embodiments of the facility.

FIG. 5 is a display diagram showing an alternative approach to displaying the display shown in FIG. 4 employed by some embodiments of the facility. By comparing FIG. 5 to FIG. 4, it can be seen that, in FIG. 5, the names or identifiers of groups in section 440 have been replaced with the top query result in each of these groups in section 540. For example, the name 443 of the "Zoologists" group has been replaced with the top query result for the "Zoologists" group, item 543. The user may similarly click on or otherwise select any of these top query results to display the entire query result for the selected group. In some embodiments, selecting a top query result in some manner displays additional information about the top query result item. In some embodiments, the group top query result items 541-542 and/or 543-544 are arranged in some or all of the ways discussed above in connection with indications 341-344.

Figure 6:
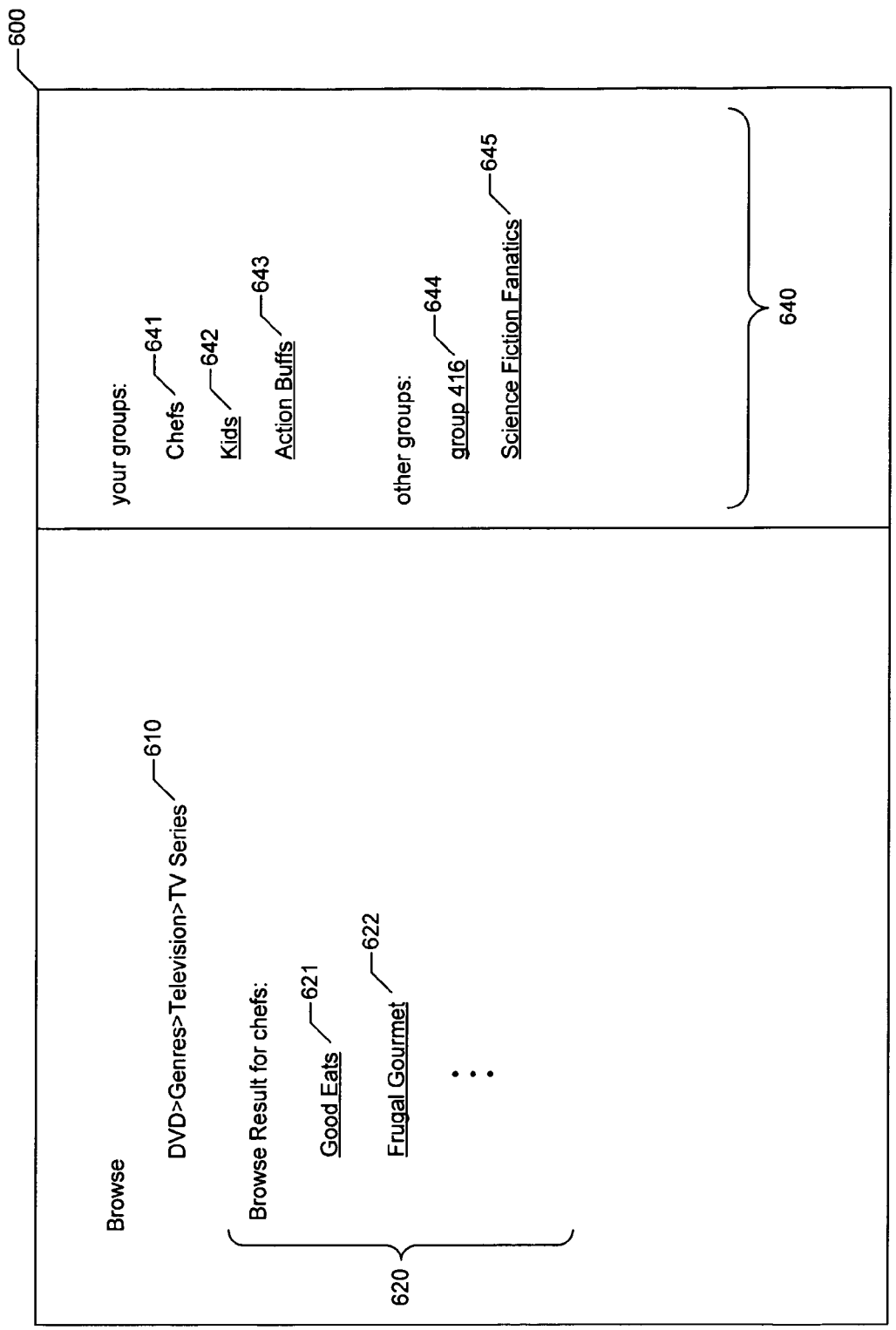
FIG. 6 is a display diagram showing the facility's tailoring of a browse result.

FIG. 6 is a display diagram showing the facility's tailoring of a browse result. The display 600 shows a browse result for the browse category DVD>genres>television>TV Series based upon the user browsing to that category within a hierarchy of categories. In result, the facility has display a browse result 620 for a "Chefs" group including items 621 and 622. These items are both located within the current browse category, and relevant to the "Chefs" group. In a manner similar to FIGS. 3-5, the user can select a different group from section 640 in order to view the browse result for that group. In some embodiments, the facility tailors browse results using one or more techniques described in U.S. Pat. No. 6,606,619, issued on Aug. 12, 2003, which is hereby incorporated by reference in its entirety.

In some embodiments, the facility does not attempt to attribute names to user groups. In some such embodiments, the facility permits the user to cycle versions of a search result tailored to different groups using controls such as a "results for next group" button.

It will be appreciated by those skilled in the art that the above-described facility may be straightforwardly adapted or extended in various ways. For example, the facility may use a variety of techniques for identifying the users in each group, adapting navigation results for a group, and/or naming and selecting groups. The facility may be used for a wide variety of purposes, with respect to items of a wide variety of types, in a wide variety of environments, in connection with a wide variety of navigation techniques. While the foregoing description makes reference to various embodiments, the scope of the invention is defined solely by the claims that follow and the elements recited therein.

I claim:

1. A computer-implemented method for tailoring search results, comprising:
   under the control of one or more computer systems configured with executable instructions,
      among a plurality of users identified as sharing at least one perspective with a distinguished user, segmenting the plurality of users into a plurality of perspective groups, each perspective group including users having similar characteristics;
      for each of the plurality of perspective groups, compiling information indicating the relevance of items among a universe of items to users included in the perspective group;
      assigning a distinguished user to at least two of the plurality of perspective groups;
      receiving a search query from the distinguished user, the query including a search request for an item;
      in response to receiving the search query, displaying to the distinguished user a first query result that is responsive to the search query and is tailored to members of a first perspective group to which the distinguished user has been assigned, the tailoring being in accordance with the information compiled for the first perspective group;
      displaying, in response to receiving the search query including the search request for the item, in addition to, and concurrently with, the displayed first query result, indications of two or more perspective groups other than the first perspective group, the two or more perspective groups including a second perspective group to which the distinguished user has been assigned and at least one perspective group to which the distinguished user has not been assigned, the second perspective group being displayed based at least in part on an affinity level weighting of the distinguished user for the second perspective group, the at least one perspective group to which the distinguished user has not been assigned being displayed based on a relevance of the item included in the search request to the at least one perspective group;
      receiving input from the distinguished user specifying the second perspective group from the indications of two or more perspective groups; and
      in response to receiving the distinguished user input specifying the second perspective group, displaying to the distinguished user a second query result that is responsive to the search query and is tailored to members of the second perspective group to which the distinguished user has been assigned, the tailoring being in accordance with the information compiled for the second perspective group.

2. The method of claim 1 wherein the information indicating the relevance of items among a universe of items to users included in at least one perspective group is compiled in response to receiving the search query.

3. The method of claim 1 wherein, for each of the plurality of perspective groups, the compiled information relates to the behavior of users included in the perspective group with respect to items among a universe of items that occurred during a distinguished period of time.

4. A computer-implemented method for tailoring navigation results, comprising:
   under the control of one or more computer systems configured with executable instructions,
      receiving a navigation request from a distinguished user, the navigation request including a search term;
      identifying a first perspective group to which the distinguished user belongs;
      associating the distinguished user with an additional perspective group to which the distinguished user shares an affinity with the users of the additional perspective group;
      in response to the navigation request, displaying to the distinguished user a first navigation result that is adapted for members of the first perspective group;
      displaying in response to the navigation request including the search request for the item, in addition to, and concurrently with the first navigation result, indications of two or more perspective groups other than the first perspective group, the two or more perspective groups including the additional perspective group and at least one other user perspective group not associated with the distinguished user, the two or more perspective groups selected based at least in part on affinity level weightings of the distinguished user for the two or more perspective groups, the at least one other perspective group not associated with the distinguished user being selected in part based on a relevance of the search term contained in the navigation request to navigation requests previously submitted by users associated with the at least one other perspective group;
      receiving user input selecting the additional perspective group from the indications of two or more perspective groups; and
      in response to receiving the user input selecting the additional perspective group, presenting to the distinguished user a second navigation result responsive to the navigation request that is adapted for members of the additional perspective group.

5. The method of claim 4 wherein the navigation request comprises a search query.

6. The method of claim 4 wherein the navigation request comprises a browse request.

7. The method of claim 4, further comprising, before receiving the navigation request, associating the distinguished user with one or more perspective groups including the identified first perspective group.

8. The method of claim 7 wherein the association is performed based upon information characterizing the distinguished user and other members of the perspective groups with which the distinguished user is associated.

9. The method of claim 8 wherein the information characterizing the distinguished user and other members of the user perspective groups with which the distinguished user is associated includes attributes.

10. The method of claim 8 wherein the information characterizing the distinguished user and other members of the perspective groups with which the distinguished user is associated includes user behaviors.

11. The method of claim 8 wherein the information characterizing the distinguished user and other members of the perspective groups with which the distinguished user is associated includes indications of item selection actions performed by the users with respect to particular items.

12. The method of claim 8 wherein, the information characterizing the distinguished user and other members of the perspective groups with which the distinguished user is associated includes indications purchase actions performed by the users with respect to particular items.

13. The method of claim 7 wherein the association is performed using one or more segmentation techniques.

14. The method of claim 13 wherein said one or more segmentation techniques includes a hierarchical clustering technique.

15. The method of claim 13 wherein said one or more segmentation techniques includes a partitional clustering technique.

16. The method of claim 7 wherein the association is performed in a manner responsive to explicit actions by users to join particular perspective groups.

17. The method of claim 7 wherein the association comprises:
identifying an initial population of users who have each submitted a navigation request similar to a navigation request submitted by the distinguished user; and
segmenting the initial population of users into two or more perspective groups.

18. The method of claim 17, wherein the navigation request submitted by each user is a search request.

19. The method of claim 18, wherein identifying the initial population of users comprises identifying an initial population of users who have each submitted a search request similar to a search request submitted by the distinguished user.

20. The method of claim 19, wherein a search request is considered similar to the search request submitted by the distinguished user if said search request includes a least one search term common to the search request submitted by the distinguished user.

21. The method of claim 19, wherein a search request is considered similar to the search request submitted by the distinguished user if said search request includes a least one search phrase common to the search request submitted by the distinguished user.

22. The method of claim 19, wherein a search request is considered similar to the search request submitted by the distinguished user if said search request is substantially the same as the search request submitted by the distinguished user.

23. The method of claim 4, further comprising adapting the second navigation result by excluding items contained in the second navigation result that are not of at least a minimum level of relevance to the additional perspective group.

24. The method of claim 4, further comprising sorting items contained in the second navigation result based upon their level of relevance to the additional perspective group.

25. The method of claim 4 wherein each presented indication of a perspective group other than the identified first perspective group comprises a mnemonic name attributed to the perspective group.

26. The method of claim 4 wherein each presented indication of a perspective group other than the identified first perspective group comprises an arbitrary identifier associated with the perspective group.

27. The method of claim 4 wherein each presented indication of a perspective group other than the identified first perspective group comprises information about an item contained by the first navigation result that is of particular relevance to the perspective group.

28. The method of claim 4 wherein the presented indications of the two or more perspective groups other than the identified first user group are presented in an order based at least in part on affinity level weightings of the distinguished user for the two or more perspective groups.

29. The method of claim 4 wherein the presented indications of the two or more perspective groups other than the identified first user group are presented in an order based at least in part upon membership confidence levels for the two or more perspective groups.

30. The method of claim 4 wherein the presented indications of the two or more perspective groups other than the identified first perspective group are further ordered based at least in part upon a level of confidence in the first navigation result adapted for members of each of the two or more perspective groups.

31. The method of claim 4, further comprising soliciting from the user a name for the identified first perspective group.

32. The method of claim 4, further comprising:
presenting to the distinguished user a distinguished control;
receiving user input selecting the distinguished control; and
in response to receiving the user input, presenting to the distinguished user a navigation result responsive to the navigation request that is adapted for members of a perspective group other than the identified first perspective group.

33. A computer-readable storage medium whose contents cause a computing system to perform a method for tailoring navigation results, comprising:
receiving a navigation request from a distinguished user, the request including a search request for an item;
identifying a first perspective group to which the distinguished user belongs;
associating the distinguished user with an additional perspective group to which the distinguished user shares an affinity with the users of the additional perspective group;
in response to the navigation request, displaying to the distinguished user a first navigation result that is adapted for members of the identified first perspective group;

displaying, in response to the navigation request including the search request for the item, in addition to, connection and concurrently with, the first navigation result, indications of two or more perspective groups other than the identified first perspective group, the two or more perspective groups including the additional user perspective group and at least one other perspective group not associated with the distinguished user, the at least one other perspective group not associated with the distinguished user being selected in part based on a relevance of the search term contained in the navigation request to navigation requests previously submitted by users associated with the at least one other perspective group;

receiving user input selecting a user perspective group from the presented indications of two or more perspective groups; and in response to receiving the user input selecting the perspective group, presenting to the distinguished user a second navigation result responsive to the navigation request that is adapted for members of the selected perspective group.

34. The computer-readable storage medium of claim 33 wherein the navigation request comprises a search query.

35. The computer-readable storage medium of claim 33 wherein the navigation request is comprises a browse request.

36. A computing system for tailoring navigation results, comprising:

a processor;

a memory device including instructions that, when executed by the processor, cause the processor to, at least:

receive a navigation request from a distinguished user, the request including a search request for an item;

identify a first perspective group to which the distinguished user belongs;

assign the distinguished user to one or more perspective groups including the identified first perspective group; and display to the distinguished user a first navigation result responsive to the navigation request that is adapted for members of the identified first perspective group, and display, responsive to the navigation request, in addition to, and concurrently with the presented first navigation result, a plurality of perspective groups other than the identified first perspective group, the plurality of perspective groups including a second perspective group assigned to the distinguished user and at least one other perspective group not assigned to the distinguished user, the second perspective group being displayed based at least in part on affinity level weightings of the distinguished user for the second perspective group, the at least one perspective group to which the distinguished user has not been assigned being displayed based on a relevance of the item to the at least one perspective group, wherein the request receiving subsystem receives a user input selecting the second perspective group from the plurality of perspective groups and the result presentation subsystem presents the distinguished user a second navigation result responsive to the user input selecting the second perspective group, the navigation request being adapted for members of the second perspective group.

37. One or more computer storage devices collectively containing a data structure for servicing navigation requests each received from a user and relating to items among a plurality of items, the computer storage devices whose content cause a computing system to perform a method, the method comprising:

identifying, for each of a plurality of perspective groups, users who are members of the perspective group; and indicating, for each of the plurality of perspective groups, a level of relevance of each of the plurality of items to the users who are members of the perspective group, such that, when a navigation request including a search request for an item is received from a requesting user, the plurality of perspective groups may be used at least to:

determine a first perspective group of which the requesting user is a member, display a first response to the navigation request featuring items indicated to be of a level of relevance to the determined first perspective group, display, in addition to, and concurrently with, the first response to the navigation request, an indication of each of a subset of the plurality of perspective groups other than the first perspective group, the subset of the plurality of perspective groups including at least one perspective group of which the requesting user is a member and at least one perspective group of which the requesting user is not a member, the at least one perspective group of which the requesting user is a member being displayed based at least in part on affinity level weightings of the requesting user for the at least one perspective group of which the requesting user is a member, the at least one perspective group of which the requesting user is not a member being displayed based on a relevance of the item to the at least one perspective group of which the requesting user is not a member;

receive a user input selecting a second perspective group from the presented subset, and tailor a second response to the navigation request to feature items indicated to be of a level of relevance to the second perspective group.

38. The computer storage devices of claim 37 wherein identifying users who are members of each perspective group includes using one or more segmentation techniques for identifying the users.

39. The computer storage devices of claim 37 wherein identifying users who are members of each perspective group includes using one or more clustering techniques for identifying the users.

40. The computer storage devices of claim 37 wherein indicating level of relevance of each item to the users who are members of each perspective group in each case includes indicating, for each of a plurality of search terms, a frequency with which users who are members of the perspective group select the item from search results produced in response to search queries containing the search term.

* * * * *

UNITED STATES PATENT AND TRADEMARK OFFICE
CERTIFICATE OF CORRECTION

| | | |
|---|---|---|
| PATENT NO. | : 8,103,659 B1 | Page 1 of 1 |
| APPLICATION NO. | : 11/448377 | |
| DATED | : January 24, 2012 | |
| INVENTOR(S) | : Joel R. Spiegel | |

It is certified that error appears in the above-identified patent and that said Letters Patent is hereby corrected as shown below:

Col. 8, Line 47, please insert --,-- after concurrently with.

Col. 11, Line 2, please delete the word "connection."

Col. 11, Line 6, please delete the word "user."

Col. 11, Line 14, please delete "user" after the words selecting a.

Col. 11, Line 25, please delete "is."

Col. 11, Line 43, please insert --,-- after concurrently with.

Signed and Sealed this
Tenth Day of July, 2012

David J. Kappos
*Director of the United States Patent and Trademark Office*